United States Patent [19]

Wallstein

[11] 3,939,728

[45] Feb. 24, 1976

[54] DOUBLE LEVER-FULCRUM CONTROL DEVICE FOR CONTROLLING THE OPENING AND CLOSING OF A FLUID VALVE

[75] Inventor: Enrique Klien Wallstein, Lima, Peru

[73] Assignee: Tecnologia Aplicada S.A., Lima, Peru

[22] Filed: Mar. 12, 1974

[21] Appl. No.: 450,447

[30] Foreign Application Priority Data
Mar. 15, 1973   Peru ..................................... 135955
June 26, 1973   Argentina ............................ 248757

[52] U.S. Cl. .................. 74/519; 137/442; 137/451; 251/260; 251/298
[51] Int. Cl.² G05G 1/04; F16K 31/18; F16K 31/44
[58] Field of Search ........... 74/519, 522.5; 137/442, 137/451; 251/260, 84, 298

[56] References Cited
UNITED STATES PATENTS

| | | | |
|---|---|---|---|
| 709,940 | 9/1902 | Thomas ........................... | 74/519 X |
| 1,385,112 | 7/1921 | Carr .................................. | 74/519 X |
| 2,246,388 | 6/1941 | Sica .................................. | 137/442 X |
| 2,875,977 | 3/1959 | Stone et al. ...................... | 137/451 X |
| 3,211,172 | 10/1965 | Parkison ........................... | 137/451 |
| 3,385,316 | 5/1968 | Couffer, Jr. ...................... | 137/451 X |
| 3,457,947 | 7/1969 | Fitzgerald ........................ | 137/451 X |

Primary Examiner—Samuel Scott
Assistant Examiner—Lance W. Chandler
Attorney, Agent, or Firm—Wenderoth, Lind & Ponack

[57] ABSTRACT

A control device of the double lever-fulcrum type for controlling the opening and closing of a fluid valve includes a single solid shaft rotatably mounted and connected to a longer or power lever. A notch is formed in the shaft to provide a preferably flat surface, one end edge of which acts on the valve element to close the valve. The fulcrum of the device comprises the longitudinal axis of the shaft, and the shorter or thrust lever of the device comprises a radius of the shaft extending from the longitudinal axis to the one end edge of the surface formed by the notch.

9 Claims, 7 Drawing Figures

DOUBLE LEVER-FULCRUM CONTROL DEVICE FOR CONTROLLING THE OPENING AND CLOSING OF A FLUID VALVE

BACKGROUND OF THE INVENTION

The present invention relates to a device for controlling the opening and closing of a fluid valve, such as a liquid or gas valve, and in particular to such a device which operates on lever principles.

As is well known, the controlling of the opening and the closing of many fluid valves is accomplished by a double lever-fulcrum system. In such a system, a longer or power lever is rigidly fixed with respect to a shorter or thrust lever, and the two levers are interconnected to pivot about a fulcrum. Therefore, a relatively slight amount of force exerted on the longer or power lever results in a relatively greater amount of force being applied by the shorter or thrust lever. It is necessary for the force applied by the thrust lever, in controlling a fluid valve, to be of sufficient strength to counteract the pressure of the fluid. Such double lever-fulcrum control devices are known to be operated by devices such as a float for controlling a liquid, or a tension spring for controlling a gas.

The effectiveness of such a double lever-fulcrum control device depends upon the ratio between the lengths of the longer and shorter levers. Specifically, the higher this ratio, the smaller the force which need be applied on the longer or power lever. Consequently, the higher such ratio, the smaller may be the size of the float (in the case of liquids) and the smaller may be the tension and size of the spring (in the case of gases).

It is of course obvious that the shorter or thrust lever must have the smallest possible length. However, in practice, the smaller the length of the thrust lever, the smaller is the space available for positioning the usual pin or shaft of a sufficient diameter for being employed as the fulcrum of the device. As the fulcrum shaft is made smaller, it of course becomes weaker, and the entire device is thus more susceptible to normal operating stresses.

SUMMARY OF THE INVENTION

With the above discussion in mind, it is a primary object of the present invention to provide a device of the double lever-fulcrum type for controlling the closing and opening of fluid valves.

More specifically, it is an object of the present invention to provide such a control device employing an unusually short thrust lever, thereby making it possible to proportionally reduce the length of the power lever.

It is a yet further object of the present invention to provide such a device which nevertheless is readily capable of sustaining normal operating stresses without breakdown and yet which may be manufactured economically.

The above objects are achieved in accordance with the present invention by uniting or integrating into a single element the shorter or thrust lever, the fulcrum, and the center of rotation and support connection of the longer or power lever. This element in accordance with the present invention is provided in the form of a solid shaft, the longitudinal axis of which corresponds to the fulcrum. The shaft has a notch therein presenting a flat surface, preferably corresponding to a diameter of the shaft, and passing through the longitudinal axis thereof. Therefore, one radius of the shaft, preferably taken along the flat surface formed by the notch, will correspond to the thrust lever of the system, and one outer edge of this radius will act on a thrust pin of the valve to control opening and closing of the valve. The power arm will be connected to the shaft in such a manner that the power arm corresponds to an extension of any radii of the shaft, including the radius thereof corresponding to the thrust lever. Preferably, the power lever will be connected to the shaft at one end thereof at a point thereof coextensive with the longitudinal axis thereof. Since the radius of the shaft may be relatively short, it is possible to obtain a short thrust lever while at the same time providing an overall system having relatively great strength to resist normal operating stresses, and in particular torsional stresses. The shaft is preferably positioned transversely in a control lever body which is fixed to the valve body proper. The end of the flat surface formed by the notch in the shaft operates on the thrust pin upon rotation of the shaft within the control lever body to operate the thrust pin to open or close the valve.

Therefore, the thrust lever, the fulcrum, and part of the power lever are formed in a single solid element, thereby eliminating the need to employ the heretofore necessary pins, rivets, hinges, and other elements.

A further advantage of the present device is that by a simple adjustment of the angle of the power lever with relationship to the shaft, the operation of the device may be adjusted within very great ranges. Therefore, the device may readily be adapted to be operable by fluid entering from any relative direction.

BRIEF DESCRIPTION OF THE DRAWINGS

These and other objects and features of the present invention will be described in more detail below with reference to the accompanying drawings wherein.

DETAILED DESCRIPTION OF THE INVENTION

Figure 1:
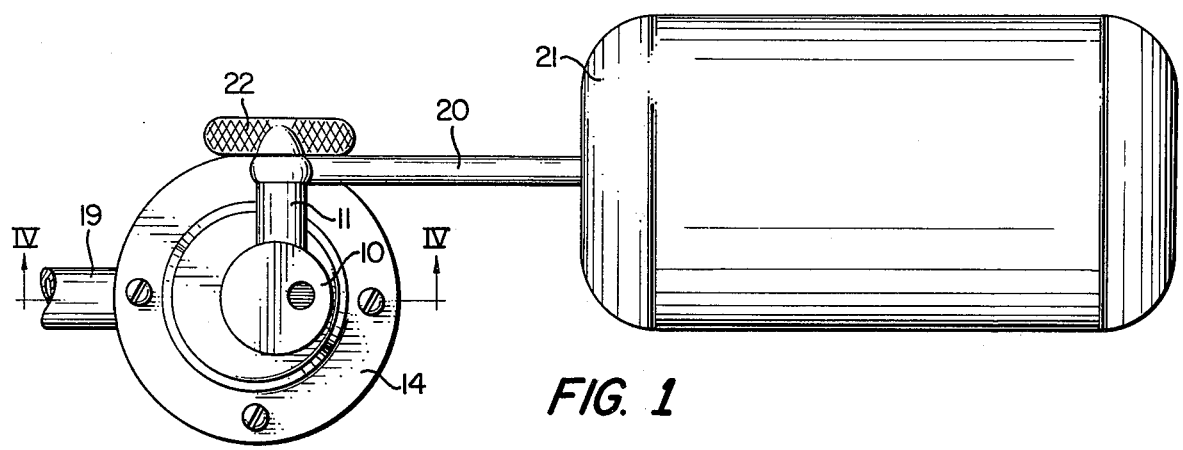
FIGS. 1 – 3 respectively illustrate schematic plan, lateral elevation and frontal elevation views of a liquid valve incorporating the control device of the present invention, and specifically illustrating the various external components.
Figure 2:
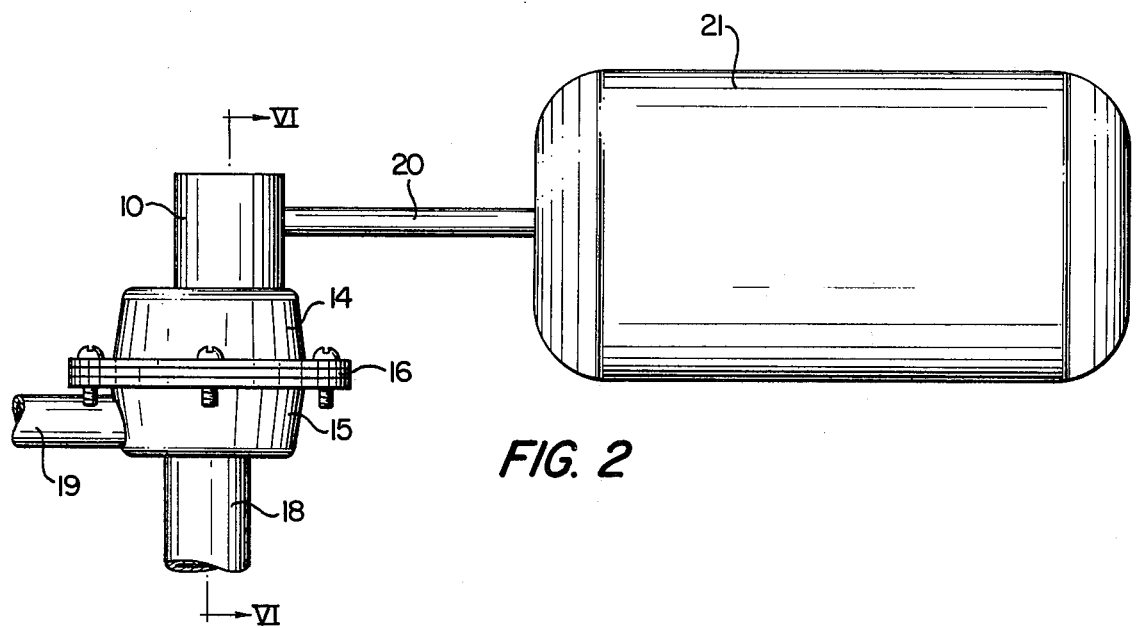
Figure 7:
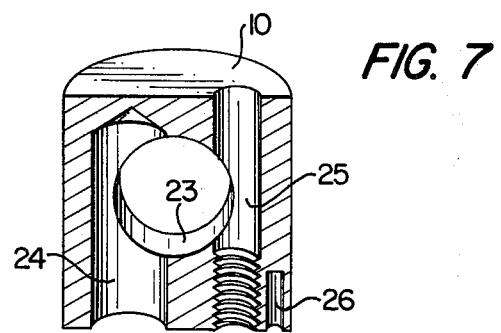
FIG. 7 is a slightly perspective longitudinal cross-sectional view through the control lever body illustrating the various openings and passages therein.
Figure 3:
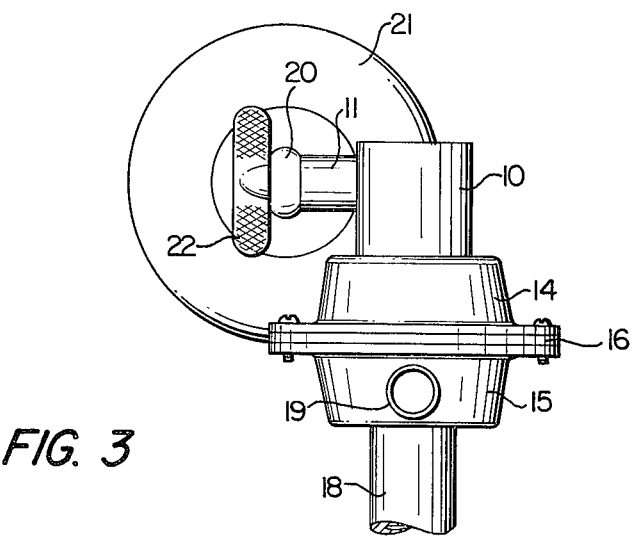
Figure 6:
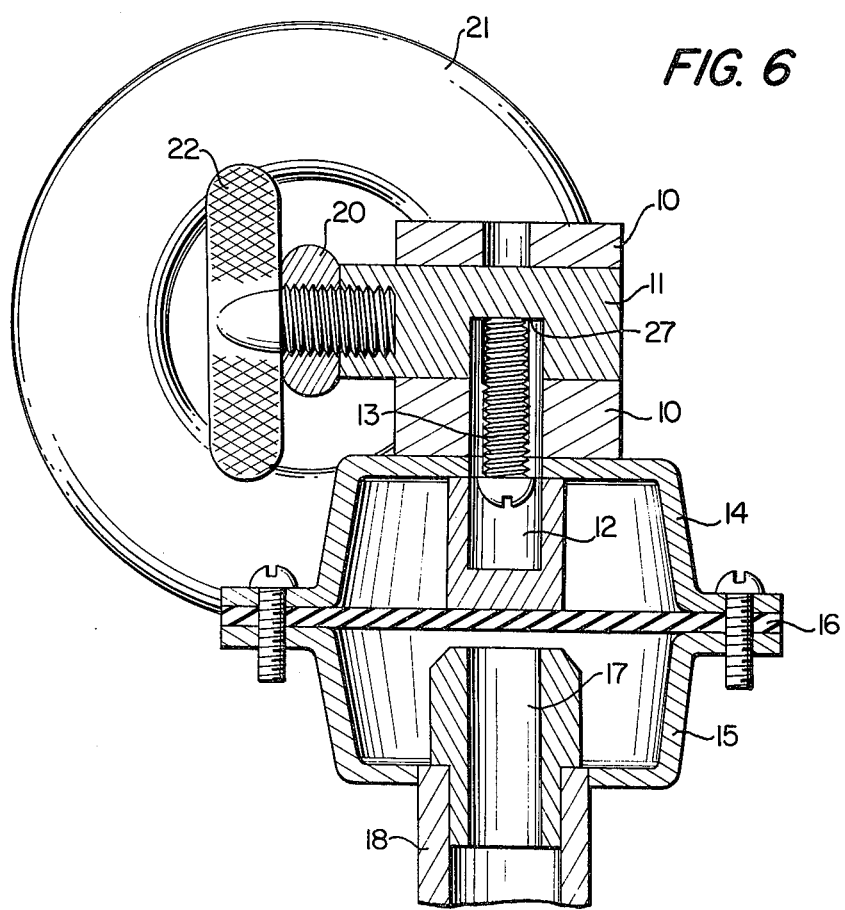
FIG. 6 is a cross-sectional view of the device taken along lines VI—VI of FIG. 2.

In the various figures, the same reference numerals are used to illustrate the same structural components.

It is to be understood that the valve structure itself forms no part of the present invention, and that such valve may be any specific known liquid or gas valve capable of operation by the control device of the present invention, as would be understood by one of ordinary skill in the art.

However, in the following description, and in the attached drawings, a preferred embodiment of the present invention will be illustrated with respect to a liquid valve of the diaphram type and operable by a float. Specifically, liquid valve A includes a valve body proper formed for instance by a pair of cups 14 and 15, the lips or ridges of which clamp therebetween by means such as screws, a flexible diaphram 16 of a known type. Into one chamber formed by the above elements extends a fluid inlet 18 and a fluid outlet 19. A suitable valve seat 17 is associated with fluid inlet 18.

Into the opposite valve chamber extends a thrust pin 12 which may have on the inner end thereof a suitable thrust block such as 12' which confronts valve seat 17.

A control lever body 10 is fixed to valve cup 14 in any suitable manner. Furthermore, control lever body 10 may be provided with means for precisely aligning control lever body 10 with valve body cup 14 such as by aligning pin opening 26 and an associated pin extending therein from valve body cup 14.

Control lever body 10 has therein a thrust pin opening 24 to slidingly receive the upper portion of thrust pin 12. Orthogonally of the axis of thrust pin opening 24 is provided a lever shaft opening 23. Rotatably mounted within opening 23 is a single solid lever shaft 11. To one end of lever shaft 11 is fixed, preferably coextensive with longitudinal axis 11' of shaft 11, longer or power lever 20, to the other end of which is attached liquid float 21. Connection of power lever 20 with lever shaft 11 may be by any suitable means, such as threaded adjusting screw 22.

Figure 5:
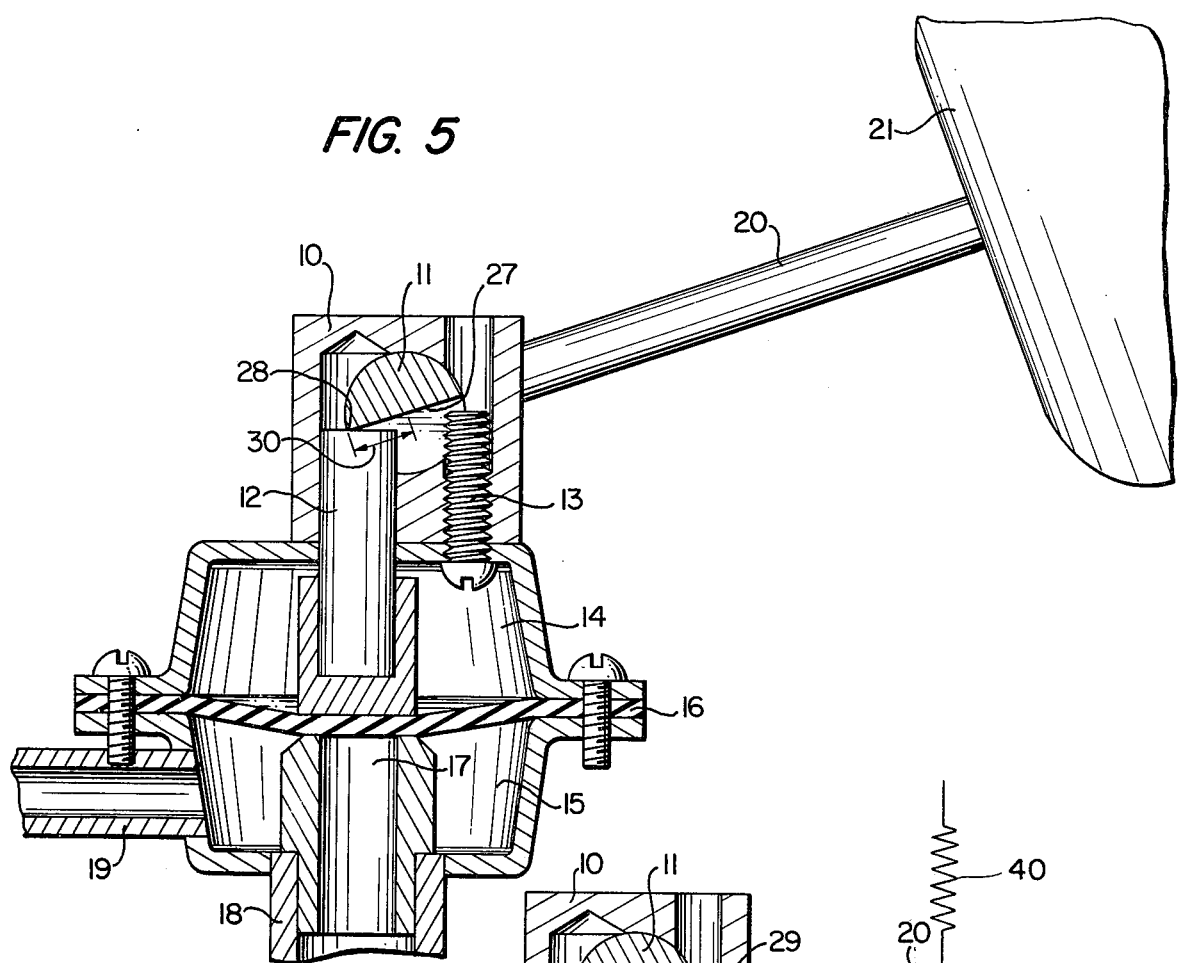
FIG. 5 is a cross-sectional view similar to that of FIG. 4, but with the valve shown in the operative or closed position.
Figure 4:
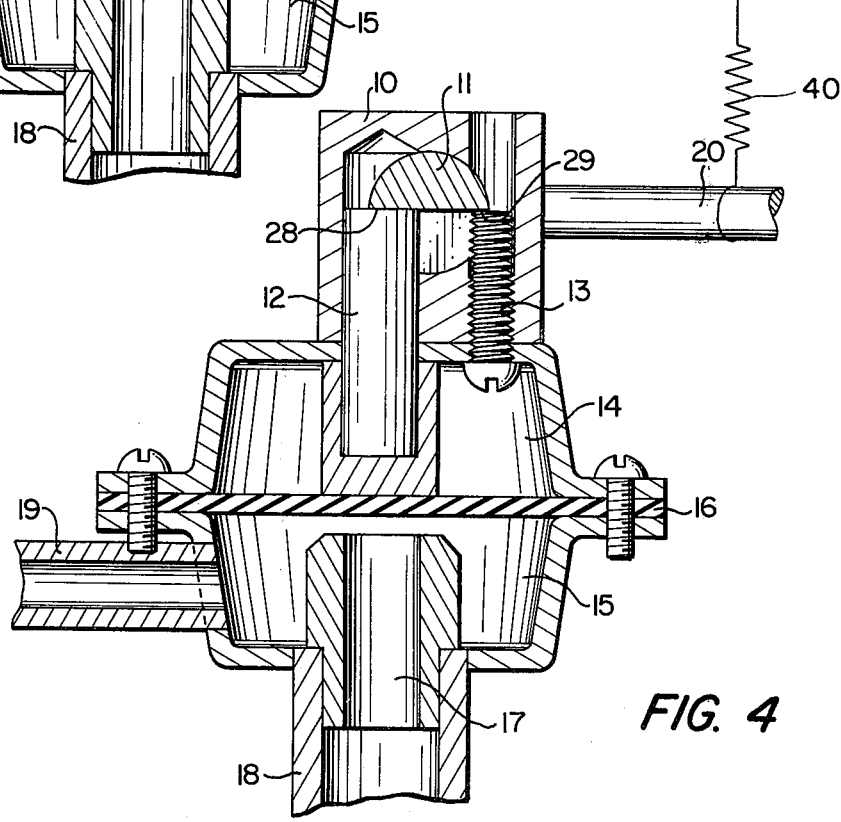
FIG. 4 is a cross-sectional view of the device with the valve in its neutral or open position, taken along the lines IV—IV of FIG. 1.

At a suitable position along the length of lever shaft 11, and in alignment with the position of thrust pin 12, is a notch in lever shaft 11. This notch forms a surface 27 which is preferably flat and which preferably passes through axis 11' of shaft 11 and therefore corresponds to a diameter thereof. Upon rotation of shaft 11, as seen in FIG. 5, one end edge 28 of surface 27 will contact the upper surface of thrust pin 12, and therefore push thrust pin 12 and thrust block 12' downwardly to force flexible diaphram 16 against valve seat 17, thereby closing liquid passage through the valve A. Movement of lever shaft 11 from the position of FIG. 4 to the position of FIG. 5 is brought about by the liquid from fluid outlet 19 raising float 21, and therefore causing power lever 20 to pivot, therefore rotating lever shaft 11 about its longitudinal axis 11'.

Accordingly, longitudinal axis 11' of lever shaft 11 becomes the fulcrum of the double lever-fulcrum control system.

Furthermore, the radius 30 of shaft 11 from longitudinal axis or fulcrum 11' to point 28 becomes the thrust lever of the system.

The degree of rotation of lever shaft 11 back to its inoperative position (shown in FIG. 4) may be controlled by any suitable means if desired. One example of such control means would be rotation limiting screw 13 extending in to rotation limiting screw opening 25 of control lever body 10. The upper or end surface of screw 13 would thereby be contacted by end edge 29 of surface 27, thereby limiting the rotation of lever shaft 11 in the direction opposite to the closing direction thereof. Due to the provision of threads on screw 13 and opening 25, the position of screw 13 may be relatively adjusted to adjust the return rotation position of lever shaft 11.

It will be apparent from the above description that the present invention uniquely provides an arrangement whereby the thrust lever (radius 30), the fulcrum (longitudinal axis 11'), and a portion of the power lever are formed from a single, solid element. Therefore, it will be apparent that the present invention offers a much simplified and yet stronger double lever-fulcrum control device than has previously been possible.

It is believed that the operation of the device of the present invention will be apparent from the above description. However, such operation will briefly be summarized.

Liquid freely enters through inlet 18 and passes through valve seat 17 and outwardly through fluid outlet 19 until it reaches a chamber containing float 21. As the amount of liquid increases, the liquid will eventually cause float 21 to lift, thereby causing power lever 20 to rotate lever shaft 11 from the position of FIG. 4 to the position of FIG. 5. Therefore, edge 28 will contact the upper surface of thrust pin 12, thus forcing thrust pin 12 and thrust block 12' downwardly against flexible diaphram 16. Diaphram 16 will thereby be forced downwardly against the liquid pressure and against valve seat 17 to stop the flow of liquid through the valve A. As the liquid in the chamber surrounding float 21 is used, float 21 will lower, and the liquid pressure will force diaphragm 16 and thrust pin 12 upwardly, thereby causing power lever 20 to rotate lever shaft 11 from the position of FIG. 5 to the position of FIG. 4. This return rotation of lever shaft 11 will be limited by the contact of edge 29 of surface 27 with the upper end of rotation limiting screw 13.

It will be readily understood that due to the relatively great size of power lever 20 with regard to the length of thrust lever 30, the control device of the present invention will be operable to close the valve by a very minimal pressure on float 21, even against a large liquid pressure.

Once again, it must be emphasized that the structure of the valve itself is not a part of the present invention, and that any known type of valve which may be opened or closed by a movement of a device such as thrust pin 12 may be controlled by the present invention.

When the double lever-fulcrum control device of the invention is employed for controlling a gas valve, there would normally be used an ordinary tension spring (shown schematically at 40 in FIG. 4) in place of float 21. Such tension spring would have a tension such that the spring would be held inoperative as long as the pressure of the gas acting thereon is more than a predetermined amount.

Although a preferred embodiment of the present invention has been described in detail, it is to be understood that the scope of the present invention is not intended to be limited to the specific structural details of the preferred embodiment. Rather, the scope of the present invention is intended to include modifications of an equivalent nature.

I claim:

1. A control device for controlling the opening and closing of a fluid valve of the type having a thrust element movable from a first open valve position to a second closed valve position, said control device being of the double lever-fulcrum type having a longer power lever and a shorter thrust lever fixed together to pivot about a fulcrum to move said thrust element from said first position to said second position upon the application of a force to said power lever, the improvement comprising:

a control lever body fixed to the body of said valve, said control lever body having therein a first opening for receipt of at least a portion of said thrust element, said control lever body having therein a second opening transverse to said first opening;

a single solid cylindrical shaft mounted to rotate about the longitudinal axis thereof at a position adjacent to said thrust element, said fulcrum comprising said longitudinal axis of said shaft, said shaft rotatably mounted in said second opening of said control lever body;

said shaft having therein a notch providing a flat surface having first and second end edges on the periphery of said shaft, said flat surface being a diameter of said shaft passing through said longitudinal axis, said first end edge of said surface contacting said thrust element, said thrust lever comprising a radius of said shaft extending from said longitudinal axis to said first end edge of said surface; and said power lever being fixed to said shaft to extend outwardly from said periphery thereof.

2. The improvement claimed in claim 1, wherein said power lever is attached to a longitudinal end of said shaft at a position thereon coextensive with said longitudinal axis.

3. The improvement claimed in claim 2, wherein said power lever is an extension of a radius of said shaft.

4. The improvement claimed in claim 3, further comprising means to selectively adjust the position of attachment of said power lever to said end of said shaft.

5. The improvement claimed in claim 1 further comprising means in said control valve body for limiting rotative motion of said shaft in a direction away from said thrust element.

6. The improvement claimed in claim 5, wherein said means for limiting comprises a third opening in said control lever body and stop means in said third opening for contact with said second end edge of said surface.

7. The improvement claimed in claim 6, wherein said stop means comprises a screw adjustably positioned in said third opening.

8. The improvement claimed in claim 1, wherein said fluid valve is a liquid valve, and further comprising a float attached to said power lever.

9. The improvement claimed in claim 1, wherein said fluid valve is a gas valve, and further comprising a tension spring attached to said power lever.

* * * * *